Figure 1:
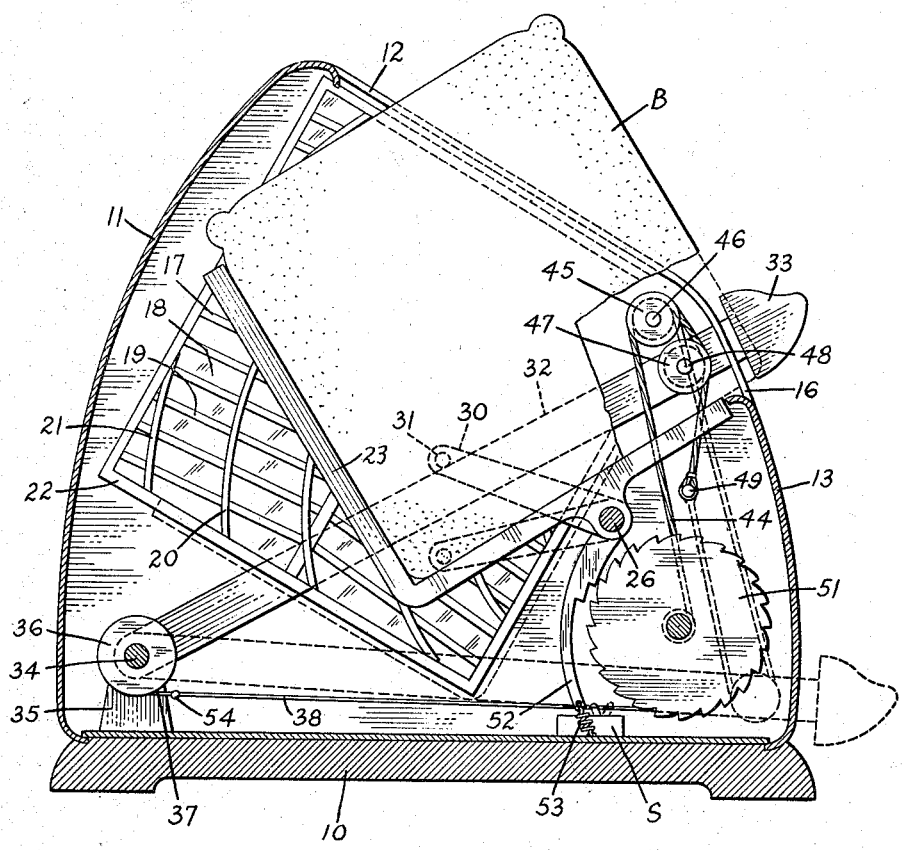

May 22, 1951          B. LERMONT          2,553,593

TOASTER

Filed July 10, 1947          2 Sheets-Sheet 1

*INVENTOR.*
BASIL LERMONT
BY
Campbell, Brumbaugh & Free
*HIS ATTORNEYS.*

May 22, 1951  B. LERMONT  2,553,593
TOASTER

Filed July 10, 1947  2 Sheets-Sheet 2

INVENTOR.
BASIL LERMONT
BY
Campbell Brumbaugh + Free
HIS ATTORNEYS.

Patented May 22, 1951

2,553,593

UNITED STATES PATENT OFFICE 2,553,593

TOASTER

Basil Lermont, New York, N. Y., assignor, by mesne assignments, to Eastern Metals Research Co., Inc., New York, N. Y., a corporation of New York Application July 10, 1947, Serial No. 759,979

10 Claims. (Cl. 161—1)

This invention relates to improvements in cooking devices and it relates particularly to improvements in cookers of the self-timing type such as for example, toasters, broilers, waffle makers and the like.

Heretofore, such self-timing cookers have included various types of escapements for timing the cooking operation. Variation in the cooking time is usually obtained by varying the rate of operation of the escapement. Such variation in rate is usually dependent upon the action of a manual control with or without a thermostat, and, therefore these prior cooking devices have been complicated, expensive and difficult to manufacture and to service.

An object of the present invention is to provide a simplified form of self-timing cooking device in which the cooking time can be regulated without an escapement or other similar mechanism.

Another object of the present invention is to provide a cooking device including a simplified timing mechanism which is regulated in accordance with the displacement of a control element from an initial position rather than by an escapement or other complicated time mechanism.

Other objects and advantages of the present invention will become apparent from the following description of a typical form of device embodying the present invention.

In accordance with the present invention, I have provided a cooking device which is provided with heating elements and movable supports for receiving the article or materials to be cooked. The supports permit the article to be disposed adjacent the heating elements and, at the conclusion of a cooking operation, move the article into a position wherein it can be removed from the cooking device.

The novelty of the cooking device resides primarily in the mechanism for controlling the duration of the heating operation. More particularly, this timing mechanism includes a spring of novel characteristics, which, through the medium of a retarding device controlled by the spring, regulates the time of operation of the heating elements in accordance with the displacement of a knob or lever out of its initial position. Thus, the device is dependent upon the distance of displacement of the controlling mechanism to vary the duration of the cooking operation and is not dependent upon a change in the speed of the timing device, as is customary in prior types of self-timing cooking devices.

Figure 2:
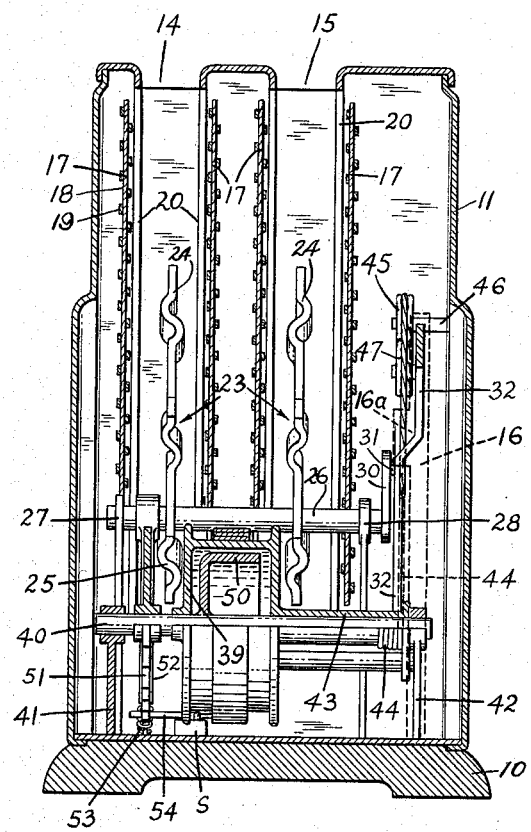

For a better understanding of the present invention, reference may be had to the accompanying drawings, in which:

Figure 1 is a view in vertical cross-section with parts broken away of a toaster embodying the present invention; and Figure 2 is a view in cross-section taken at right angles to the section of the device disclosed in Figure 1, also with parts broken away to disclose details of construction.

One form of mechanism embodying the invention is disclosed in the drawings as applied to a device for toasting slices of bread. It will be understood that the timing mechanism may be used with other types of self-timing cooking devices and that the toaster is selected as illustrative of the invention. The toaster shown in the drawings may include a base member 10 formed of metal, plastic or wood, as may be desired, and has a metal casing 11 of any desired shape thereon. The casing 11 preferably is provided with an inclined top portion 12 and an arcuate front portion 13. The inclined top portion 12 is provided with a pair of slots 14 and 15 for receiving slices of bread and is also provided with a narrow slot 16, partially shown in Figure 1, and shown in dotted lines, Figure 2, below and to the right of the slot 15.

It will be understood that the number of slots 14 and 15 may be varied, to accommodate fewer or more than two slices of bread.

Mounted within the casing are four heating elements 17 which may consist of sheets 18 of mica or other insulating and heat-resisting material, around which are wound resistance heating wires 19 of conventional type. Two pairs of the heating elements 17 are provided in the toasting device so that a heating element is disposed at each edge of the slots 14 and 15. Interposed between each of the heating elements 17 and the bread B in each of the slots is a wire grill 20 which prevents contact between the slice of bread and the heating element. Each of the grills 20 may consist of a plurality of arcuate wires 21 welded at their ends to a frame 22 supported within the casing 11.

Each element for supporting a slice of bread B may consist of a generally L-shaped member 23 which is provided with suitable corrugations 24 and 25 to provide the necessary width for supporting the slices of bread. Both of the supports 23 are fixed to a shaft 26 which extends transversely of the casing and is rotatably mounted in the brackets 27 and 28 secured to the base 10 of the toaster. The supports 23 are capable of rocking movement between a position in which corners of the slices B of bread are exposed through the openings 14 and 15 and a position in which the slices of bread are disposed wholly within the casing and generally within the area of the heating elements 17.

Movement of the supports 23 between these positions is provided by means of a rearwardly projecting lever 30 (Figure 1) fixed to the shaft 26. The lever 30 has a laterally extending pin 31 thereon which overlies a control lever 32 extending through the slot 16. The lever 32 is provided with an operating knob 33 on its outer end and is pivotally mounted at its rear end on a shaft 34 extending transversely of the casing and mounted in the brackets 35 at its opposite ends. The lever 32 can be moved along the slot 16. The slot 16 is provided with a lateral notch 16a shown in dotted lines in Figure 2, whereby the lever may be pushed into the notch so that it is retained about one-third of the distance between its upper-most position, as shown in Figure 1, and its lower-most position, as shown in dotted lines. When the lever 32 is engaged in the notch 16a the lever 30 will be rocked down to its dotted line position to permit the slices B to be disposed wholly within the casing 11 to keep them warm when not required immediately.

The duration of the toasting operation is controlled by the position of the lever 32 along the slot 16. Thus, when the lever 32 is moved to the dotted line position, and released, the bread B will be subjected to an extended heating period before it is rocked into a position to be removed from the toaster. If the lever is moved downwardly a shorter distance, the heating period is proportionally decreased. This control is accomplished by the following timing mechanism.

Rotatably mounted on the shaft 34 is a spool or reel 36 around which is coiled a spring 37 which is characterized by having every increment of its length equally resistant to bending stresses exerted thereon. This spring will be referred to as a constant-tension spring, for it always exerts the same tension tending to restore it to coil form regardless of the amount the spring is unwound. The spring 37 is connected at its outer end to a flexible metal tape 38 which does not have spring characteristics. The tape 38 is wrapped around a drum 39 which is rotatably mounted on a shaft 40 supported in the bearings 41 and 42 in the casing 11. The drum 39 has a tubular extension 43 thereon forming a reel around which is wrapped a cord or flexible cable 44. The cord or cable 44 passes over a pulley or sheave 45 rotatably mounted on a stub shaft 46 projecting from the wall of the casing and is wound around a second pulley or sheave 47 which is rotatably mounted on a pin 48 projecting from the lever 32. The end of the cable 44 is anchored on a pin 49 fixed to the casing.

An inner rotor member 50 is fixed to the shaft 40. The rotor member 50 is disposed within the drum 39 which contains viscous material, such as a viscous or semi-plastic silicon oil of constant viscosity, so that relative rotation between the drum 39 and the rotor 50 is resisted by the drag or friction of the liquid or semi-plastic material exerted between the drum 39 and the rotor 50.

A ratchet wheel 51 is fixed to the shaft 40 for cooperation with a pawl member 52 which is pivotally supported on the shaft 26. The lower end of the pawl member 52 is connected with a compression spring 53 which acts like a snap action toggle to retain the pawl either in engagement with the ratchet wheel 51 or out of engagement with the ratchet wheel. The pawl 52 is moved by means of a pin 54 projecting laterally from the ribbon 38, this pin being supported with sufficient flexibility to permit it to pass by the pawl 52 in either direction of movement after the pawl has been displaced into or out of engagement with the ratchet wheel 51.

The pin 54 may also be used to actuate a switch S, for energizing and deenergizing the heating elements 17. If desired the lever 32 or the lever 30 may be used for actuating the switch. Preferably the switch is positioned so that it is closed as the lower edge of the lever moves below the notch in the slot 16 and is opened as the lower edge of lever 32 approaches the lower edge of the notch 16a in the slot 16. In other words, the notch 16a in the slot 16 is in such a position that the heating elements 17 are not energized when the lever 32 is engaged in the notch.

In operation, slices of bread B may be inserted through the slots 14 and 15 on to the supports 23. The lever 32 is then depressed, for example, to the dotted line position shown. During the downward movement of the lever 32, the lever 30, which controls the position of the supports 23, is allowed to move counter-clockwise, thereby permitting the supports 23 to move counter-clockwise by means of gravity to dispose pieces of bread between the heating elements 17. At the same time, the downward movement of the lever 33 unwinds the cord or cable 44 from the sleeve 43 and causes the drum 39 to rotate in a counter-clockwise direction, as viewed in Figure 1. Such counter-clockwise rotation of the drum 39 winds up the tape 38 on the drum and unwinds the spring 37 on the reel 36. The pin 54 also moves toward the right, closes the switch S, and trips the pawl 52 into engagement with the ratchet wheel 51, which is capable of rotating relatively to the pawl in this direction of rotation of the drum 39. Such rotation of the ratchet wheel 51 is produced by the frictional drag of the viscous material between the drum 39 and rotor 50. When the lever 32 is released, the spring 37 tends to coil up on the reel 36, and, as a consequence, it rotates the drum 39 in a clockwise direction at constant speed due to the constant tension exerted by the spring 37. Free rotation of the drum 39 is prevented, however, because the pawl 53 holds the ratchet wheel 51 stationary and the frictional drag of the viscous material between the rotor 50 and the drum 39 permits only a relatively slow rotation of the drum 39 in a clockwise direction. As the drum 39 rotates, it winds up the cable 44 on the sleeve 43, and, as a consequence, gradually moves the lever 32 back toward its upper-most position. When the lever 32 reaches about the position of or slightly below the notch 16a, the pin 54 which is moving toward the left, trips the pawl 52 and moves it out of engagement with the ratchet wheel 51 thereby permitting the rotor 50 to rotate freely with the drum 39. The heater switch S is opened simultaneously. Inasmuch as the drum 39 is relieved of the drag of the viscous material the spring quickly rotates the drum 39 and moves the lever 32 to its upper-most position. As the lever 32 moves upwardly past the notch 16a it rocks the lever 30 clockwise and moves the article supports 23 and the toast to a position whereby the latter may be removed from the toaster. This last movement of the lever 32 is much quicker than its movement during the toasting operation.

The duration of the toasting operation can be regulated by moving the lever 32 to different positions along the slot 16 before releasing the lever inasmuch as the toasting time is proportional to the distance the lever 32 is displaced from its upper-most position. The timing of the toaster is not altered by the heat produced by the heating elements, for the reason that a constant viscosity material is used in the retarding mechanism. Therefore, the heating time is proportional to the extent of displacement of the lever 32, thereby permitting close control of the cooling time under all conditions.

From the foregoing description, it will be apparent that I have provided a toasting device which is capable of efficient and accurate timing of a toasting or other cooking operation. It will be understood, of course, that the device is susceptible to modification in that it may be provided with only one toast receiving slot or more than two slots, as desired. It may be modified for use as a broiler or a waffle maker and is susceptible to considerable modification in the appearance of the casing and in the arrangement of the operating elements in the casing. Therefore, the form of the invention described herein should be considered as illustrative and not as limiting the scope of the following claims.

I claim:

1. A timing mechanism for self-timing devices comprising a rotatable drum, a freely rotatable member, a normally coiled constant-tension spring wound on said member and having a free end connected to said drum and urging it in one direction of rotation toward an initial position, means for rotating said drum away from said initial position in the opposite direction to unwind said spring at least partially from said member, a friction member adjacent to said drum for retarding movement of said drum, and control means for rendering the friction means effective and ineffective to retard the movement of said drum.

2. A timing mechanism for self-timing devices comprising a rotatable drum, a normally coiled constant-tension spring connected to said drum and urging it in one direction of rotation toward an initial position, means for rotating said drum away from said initial position in the opposite direction to uncoil and stress said spring, friction means for retarding rotation of said drum, control means for rendering the friction means effective and ineffective to retard the movement of said drum, and means movable in response to rotation of said drum in said opposite direction to actuate said control means to render said friction means effective to retard the rotation of said drum in said one direction, said movable means then actuating said control means to render said retarding means ineffective as said drum approaches said initial position.

3. A timing mechanism for self-timing devices comprising a rotatable drum, a constant-tension spring connected to said drum and urging the latter toward an initial position, means for rotating said drum away from said initial position to stress said spring, a rotor in said drum and rotatable relatively thereto, a viscous material in said drum for retarding relative rotation of said drum and rotor, and a locking member for releasably holding said rotor against rotation with said drum when the latter is rotated toward said initial position.

4. A timing mechanism for self-timing devices comprising a rotatable drum, a constant-tension spring connected to said drum and urging the latter toward an initial position, means for rotating said drum away from said initial position, a rotor in said drum and rotatable relatively thereto, a viscous material in said drum for retarding relative rotation of said drum and rotor, a releasable locking member to hold said rotor against rotation with said drum when the latter is rotated toward said initial position and to release said rotor for rotation with said drum away from said initial position, and an actuating member movable in response to movement of said drum to release said locking member and thereby release said rotor for rotation with said drum as the latter approaches said initial position.

5. A timing mechanism for self-timing devices comprising a rotatable drum, a constant-tension spring connected to said drum and urging the latter toward an initial position, means for rotating said drum away from said initial position, a rotor in said drum and rotatable relatively thereto, a viscous material in said drum for retarding relative rotation of said drum and rotor, a ratchet wheel fixed to said rotor, a pawl member movable from a disengaged position into engagement with said ratchet wheel to prevent rotation of said rotor with said drum toward said initial position, and a member movable in one direction in response to movement of said drum away from said initial position for moving said pawl from said disengaged position into engagement with said ratchet wheel.

6. A timing mechanism for self-timing devices comprising a rotatable drum, a constant-tension spring connected to said drum and urging the latter toward an initial position, means for rotating said drum away from said initial position, a rotor in said drum and rotatable relatively thereto, a viscous material in said drum for retarding relative rotation of said drum and rotor, a ratchet wheel fixed to said rotor, a pawl member movable from a disengaged position into engagement with said ratchet wheel to prevent rotation of said rotor with said drum toward said initial position, and a member movable in one direction in response to movement of said drum away from said initial position for moving said pawl from said disengaged position into engagement with said ratchet wheel, said member being movable in the opposite direction as said drum approaches said control position to move said pawl to said disengaged position.

7. A timing mechanism for self-timing devices comprising a rotatable drum, a spring connected to said drum and urging the latter toward an initial position, means for rotating said drum away from said initial position, a rotor in said drum and rotatable relatively thereto, a viscous material in said drum for retarding relative rotation of said drum and rotor, and control means holding said rotor against rotation with said drum when the latter is rotated toward said initial position and for releasing said rotor for rotation with said drum when the latter is rotated away from said initial position.

8. In a timing device, the combination of a coiled spring, a member supporting said spring for bodily rotation about its axis to permit said spring to be unwound by stress exerted on one end of said spring, a rotary member, means connecting said one end of said spring to said rotary member, means for rotating said rotary member in one direction to unwind said spring and produce a stress tending to rotate said rotary member in the opposite direction, and a device cooperating with said rotary member to control rotation of the latter in said opposite direction.

9. In a timing device, the combination of a coiled spring, a member supporting said spring for bodily rotation about its axis to permit said spring to be unwound by stress exerted substantially uniformly on one end of said spring, a rotary member, means connecting said one end of said spring to said rotary member, means for rotating said rotary member in one direction to unwind said spring and produce a substantially uniform stress tending to rotate said rotary member in the opposite direction, and a device cooperating with said rotary member to frictionally retard rotation of the latter in said opposite direction.

10. In a timing device, the combination of a coiled spring, a member supporting said spring for bodily rotation about its axis to permit said spring to be unwound by stress exerted on one end of said spring, a rotary member, means connecting said one end of said spring to said rotary member, means for rotating said rotary member in one direction to unwind said spring and produce a stress tending to rotate said rotary member in the opposite direction, a rotary device, friction means interposed between said rotary device and said rotary member to frictionally retard rotation of said rotary member in either direction of rotation of the latter relative to said rotary device, means supporting said rotary device for rotation with and relative to said rotary member, and a retaining member for releasably retaining said rotary device against rotation in said opposite direction.

BASIL LERMONT.

REFERENCES CITED

The following references are of record in the file of this patent:

UNITED STATES PATENTS

| Number | Name | Date |
|---|---|---|
| 2,293,741 | Lucia | Aug. 25, 1942 |
| 2,343,347 | Turner | Mar. 7, 1944 |